(12) United States Patent
Kataoka et al.

(10) Patent No.: US 7,059,297 B2
(45) Date of Patent: Jun. 13, 2006

(54) STOP CONTROL APPARATUS FOR INTERNAL COMBUSTION ENGINE

(75) Inventors: Kenji Kataoka, Susono (JP); Toshiaki Asada, Mishima (JP); Shuichi Ezaki, Susono (JP); Kimitoshi Tsuji, Susono (JP); Yasushi Kusaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 230 days.

(21) Appl. No.: 10/722,421

(22) Filed: Nov. 28, 2003

(65) Prior Publication Data
US 2004/0107926 A1    Jun. 10, 2004

(30) Foreign Application Priority Data
Dec. 5, 2002    (JP) ............................. 2002-354244

(51) Int. Cl.
*F02D 29/00* (2006.01)
*F01L 31/00* (2006.01)

(52) U.S. Cl. ................ 123/322; 123/90.15; 123/90.23; 123/179.4; 701/115

(58) Field of Classification Search ............. 123/90.15, 123/90.23, 197.4, 322, 179.4; 701/102, 115
See application file for complete search history.

(56) References Cited

U.S. PATENT DOCUMENTS

| | | | |
|---|---|---|---|
| 5,529,549 A * | 6/1996 | Moyer | 477/189 |
| 6,526,745 B1 * | 3/2003 | Ogiso | 60/285 |
| 6,647,955 B1 | 11/2003 | Sieber | 123/322 |
| 6,704,642 B1 * | 3/2004 | Moriya et al. | 701/115 |

FOREIGN PATENT DOCUMENTS

| | | |
|---|---|---|
| DE | 199 60 984 A1 | 6/2001 |
| DE | 100 30 001 A1 | 7/2001 |
| EP | 1 074 713 A1 | 2/2001 |
| EP | 1 232 896 A2 | 8/2002 |
| EP | 1 329 620 A1 | 7/2003 |
| JP | A 9-264235 | 10/1997 |
| JP | A-2001-140665 | 5/2001 |
| JP | A-2001-225674 | 8/2001 |

* cited by examiner

*Primary Examiner*—Willis R. Wolfe
*Assistant Examiner*—Johnny H. Hoang
(74) *Attorney, Agent, or Firm*—Oliff & Berridge, PLC (57) ABSTRACT

A stop control apparatus for an internal combustion engine is provided with a valve mechanism capable of operating at least one of an intake valve and an exhaust valve independently a crankshaft of an internal combustion engine, and a valve controlling device for controlling an operation of the valve mechanism so that the internal combustion engine is stopped in a predetermined state.

10 Claims, 9 Drawing Sheets

STOP CONTROL APPARATUS FOR INTERNAL COMBUSTION ENGINE

BACKGROUND OF THE INVENTION

1. Field of the Invention

The present invention relates to an apparatus for controlling an operation of an intake valve or an exhaust valve of an internal combustion engine so as to stop the internal combustion engine in a predetermined state.

2. Description of the Related Art

In order to improve startability of an internal combustion engine, there is suggested an apparatus for operating a motor generator when an internal combustion engine is being stopped, and braking or driving a crankshaft of the internal combustion engine so as to stop the crankshaft thereof at a predetermined angle (see Japanese Patent Application Laid-Open No. HEI9-264235).

Since the above-mentioned prior art, however, requires the motor generator in order to control a stop position, when the motor generator is not connected with the crankshaft of the internal combustion engine, this device is inapplicable. Even when the motor generator is provided, it is necessary to improve controllability of the stop position of the motor generator in order to stop the crankshaft in a desirable position.

SUMMARY OF THE INVENTION

It is, therefore, an object of the present invention to provide a stop control apparatus for an internal combustion engine which is capable of stopping the internal combustion engine in a predetermined state using a device different from a motor generator.

In order to solve the above problem, the present invention provides a stop control apparatus for an internal combustion engine, including: a valve mechanism for operating at least one of an intake valve and an exhaust valve independently of an output shaft of an internal combustion engine; and a valve controlling device for controlling the operation of the valve mechanism so that the internal combustion engine is stopped in a predetermined state.

According to this stopped control apparatus, the intake valve or the exhaust valve are operated arbitrarily by the valve mechanism irrespectively of a rotating state of the output shaft, thereby variously changing a state in a cylinder of the internal combustion engine. For example, an amount of intake air is adjusted by changing valve characteristics of the intake valve (opening and closing timing, a lift amount, a working angle and the like), so that pressure (compression pressure) generated in a compression stroke can be set to a desired value. Further, the state in the cylinder can be changed also by changing valve characteristics of the exhaust valve. Accordingly, it is possible to adjust the inside of the cylinder into a specified condition or state and stop the internal combustion engine by controlling the operation of the valve mechanism. In the present invention, the valve mechanism may have ability to arbitrarily operate the intake valve or the exhaust valve with respect to the output shaft of the internal combustion engine. To operate arbitrarily means that the intake valve or the exhaust valve is operated regardless of the state of the output shaft. For example, "to operate arbitrarily with respect to the output shaft" includes a manner such that although the output shaft is rotated, the intake valve or the exhaust valve is stopped, or an operating speed of the intake valve or the exhaust valve can be set regardless of the rotating speed of the output shaft, and the opening and closing timing of the intake valve or the exhaust valve can be changed regardless of a rotational position of the output shaft. A concept such that "to stop in the predetermined state" includes that a state where the internal combustion engine is stopped is controlled into a constant state, and a processing for stopping the internal combustion engine is controlled into a constant state. These states may be brought by controlling the operation of the valve mechanism, namely, the operation of the intake valve or the exhaust valve. In the present invention, the internal combustion engine is preferably a reciprocating type one which converts a reciprocating movement of a piston into a rotational movement of a crankshaft as the output shaft, but another type internal combustion engine can be included in the scope of the invention as long as it can control the state at the time of stop according to the valve mechanism.

The internal combustion engine is used as a driving source of a vehicle, the vehicle is capable of generating regenerative power by driving an electric generator using kinetic energy at the time of deceleration, the valve mechanism is capable of driving both the intake valve and the exhaust valve, and the valve controlling device controls the operation of the valve mechanism so that the intake valve and the exhaust valve are closed during execution of the regenerative power generation, and that the internal combustion engine is stopped after the intake valve or the exhaust valve are opened to release compression pressure of the internal combustion engine, as in the predetermined state, when the internal combustion engine is stopped successively from the state that the regenerative power generation is executed.

When the intake valve and the exhaust valve are closed during execution of the regenerative power generation and the intake and exhaust operation is stopped, resistance of the internal combustion engine is reduced so that an amount of the regenerative power generation can be increased. However, when the internal combustion engine is stopped with the intake valve and the exhaust valve being closed, comparatively strong compression pressure remains in the cylinders, and an inverting function (a function for pushing back the output shaft) due to the compression pressure appears remarkably just before the internal combustion engine is stopped, and thus vibration is increased. The compression pressure remaining in the cylinders causes deterioration of startability at the next start of the internal combustion engine. Such a disadvantage can be solved by stopping the internal combustion engine after the compression pressure is released as mentioned above. Note that the driving source, here, is not limited to one for outputting a power for traveling, and includes also a driving source for supplying a power to an electric motor as the driving source for traveling, for example. In a word, the internal combustion engine may output a power for any applications in the vehicle.

Further, when the internal combustion engine is stopped successively from the state where the regenerative power generation is executed, the valve controlling device maintains the intake valve and the exhaust valve in a closed state until burning of air-fuel mixture sealed in a cylinder of the internal combustion engine is ended, and controls the operation of the valve mechanism so that the intake valve or the exhaust valve is opened after the burning is ended. In this case, there is no fear that unburned air-fuel mixture is discharged as an exhaust gas from the internal combustion engine, and this case is preferable from viewpoints of an influence given to environment and durability of an exhaust emission purifying device such as a catalyst.

In the stop control apparatus of the present invention, the internal combustion engine is provided with a plurality of cylinders in such a manner that timings of compression strokes of the cylinders are deviated from each other, and the valve controlling device controls the operation of the valve mechanism so that the internal combustion engine is stopped, as in the predetermined state, when a rotational position of the output shaft is within a specified range in a part of a rotating range of the output shaft.

In the internal combustion engine having the plural cylinders, a determination cannot be uniquely made when which cylinder is in the compression stroke, the internal combustion engine is stopped, and thus a stop position of the output shaft becomes inconstant. According to the stop control apparatus of the present invention, however, by controlling the operation of the valve mechanism, it is possible to properly adjust the compression pressure generated in each cylinder of the internal combustion engine, thereby stopping the output shaft thereof to a position or range in which the specific cylinder is in the compression stroke. In such a manner, when the stop position is controlled within a specific range, dispersion of a starting condition of the internal combustion engine is suppressed so that stable start can be realized. A feeling of the start becomes constant.

As one preferable example of stopping the output shaft in the specified range, the valve controlling device can control a compression workload to be generated in a compression stroke during a process of stopping the internal combustion engine correspondingly to the rotational position of the output shaft during the process of stopping the internal combustion engine, to thereby stop the internal combustion engine when the output shaft is within the specified range. For example, the output shaft can be stopped in a specified range by controlling the compression workload such that it becomes large when the output shaft is in the specified range, while becomes small when in the other range. The valve controlling device controls the operation of the valve mechanism so that a compression workload in at least one specific cylinder of the cylinders becomes larger than a compression workload in the other cylinders, to thereby stop the internal combustion engine when the output shaft is within the specified range. By setting a compression workload in the specific cylinder to be larger than that in the other cylinders, the internal combustion engine can be stopped while the specific cylinder is in the compression stroke. The adjustment of the compression workload can be realized by changing the valve characteristics of the intake valves so as to increase or decrease an amount of intake air. A compression workload can be increased or decreased by changing the characteristics of the exhaust valves so as to adjust an amount of exhaust gas remaining in the cylinders.

In the case where a compression workload is controlled as mentioned above, the valve controlling device controls the operation of the valve mechanism so that the compression workload generated in the process of stopping the internal combustion engine is gradually reduced. In this case, since the compression pressure is gradually reduced according to decrease in the compression workload, vibration is suppressed and the internal combustion engine can be gently stopped.

In the case where control is made so that the output shaft is stopped in the specified range, the apparatus may be provided with a stop position setting device for detecting a state of the internal combustion engine at the time of start and for setting the specified range based on a detected state. In this case, the next and after stop positions of the output shaft of the internal combustion engine can be set taking a state at the time of start into consideration. The output shaft can be, therefore, stopped with a position inconvenient to the start being avoided, and the output shaft can be stopped in a position convenient to the start. The state of the start can be determined from various parameters relating to startability of the internal combustion engine. For example, a change in a number of revolution of the output shaft at the time of start, a fluctuation of torque of the output shaft, vibration and the like are detected so that the state at the time of start can be specified. In the case where start is executed by the electric motor, the state at the time of start may be specified by power consumption of the electric motor.

The stop position setting device may detect information correlated with the compression workload at the time of start as the state of the start, and may set the specified range based on a detected information so that the internal combustion engine is stopped in a state that a cylinder of the cylinders where the compression work load at the time of start is relatively smaller than the other cylinders is in the compression stroke.

When such a control is executed, the internal combustion engine is started from a state that the cylinder in which a compression workload is small is in the compression stroke. Starting energy of the internal combustion engine can be, therefore, reduced. As a result, the electric motor for starting the internal combustion engine is miniaturized, and the power consumption at the time of start is suppressed so that deterioration of the battery can be prevented and a fuel consumption rate of the internal combustion engine can be improved. The specified range of a cylinder of the plural cylinders, where a compression workload at the time of start is the least, may be preferentially determined, or the specified range may be determined with a cylinder where a compression workload at the time of start is the largest being avoided.

The internal combustion engine of the present invention can be applied to both a vehicle provided with only the internal combustion engine as the driving source and a vehicle provided with also another driving source such as a motor generator. With respect to the stop of the internal combustion engine, the control device may automatically stop the internal combustion engine when a predetermined stop permission condition, which is related with an operating condition of the internal combustion engine, is satisfied, or the control device may stop the internal combustion engine correspondingly to an operation of turning off an ignition switch by an operator. In the former stop mode, the internal combustion engine is stopped at the time of, for example, deceleration or an idling state of the vehicle. Such a stop form is discriminated from the stop state when the internal combustion engine is not under the control of the control device, and may occasionally be referred to as "halt". In the vehicle where such automatic stop (halt) is executed, since stop and start of the internal combustion engine are frequently repeated, particularly great advantage can be gained by shutting down the internal combustion engine in a predetermined state by means of the stop control apparatus of the present invention.

DESCRIPTION OF THE PREFERRED EMBODIMENTS

First Embodiment

Figure 1:
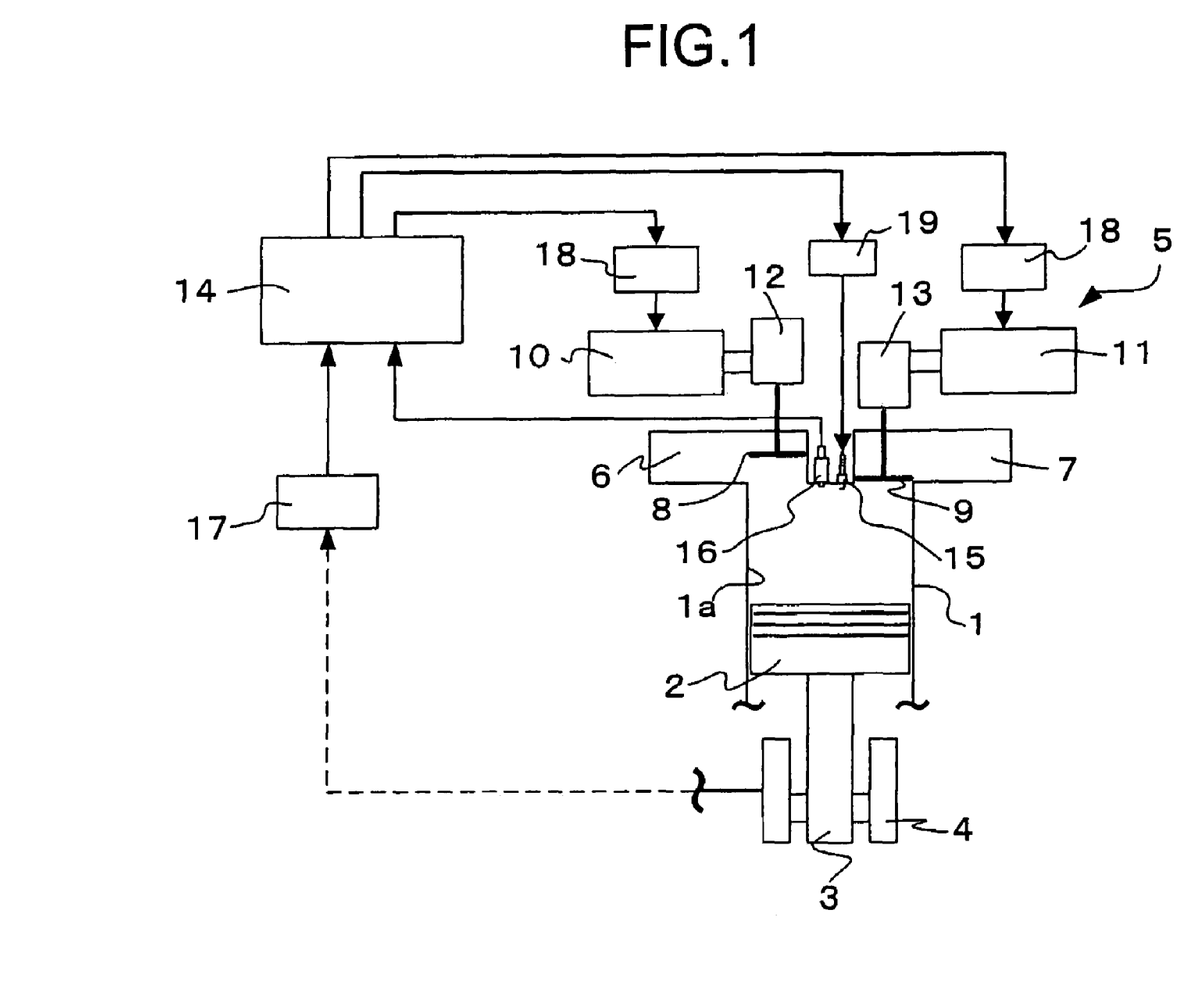
FIG. 1 is a diagram illustrating main sections of an internal combustion engine and a control device according to an embodiment of the present invention.

FIG. 1 illustrates a stop control apparatus according to a first embodiment of the present invention and an internal combustion engine to which the stop control apparatus is applied. An internal combustion engine 1 is constituted as a four-cycle gasoline engine which is mounted to a vehicle as a power source for traveling. The vehicle mounted with the internal combustion engine 1 is provided with a motor generator (not shown) as another power source for traveling. Such a vehicle is known as a so-called hybrid vehicle. In the hybrid vehicle, the internal combustion engine 1 and the motor generator are used appropriately according to suitable control rules, but in the present embodiment, operations of the internal combustion engine 1 and the motor generator are controlled at least in the following manner.

For the operation of the internal combustion engine 1, a stop permission condition is set in connection with an operating condition, and when the stop permission condition is satisfied, the operation of the internal combustion engine 1 is temporarily stop. When a start permission condition is satisfied during the stop, the internal combustion engine 1 is started. The stop permission condition is set so as to be satisfied, for example, when a vehicle speed is equal to or less than a specified speed during deceleration, or the internal combustion engine 1 is in an idling state. Further, the motor generator is controlled so as to be driven by wheels at the time of deceleration or braking of the vehicle and to generate regenerative power. An electric power obtained by the regenerative power generation is used for charging a battery (not shown) as a power source of the motor generator.

The internal combustion engine 1 is provided with four cylinders arranged in line in a predetermined direction. FIG. 1, however, illustrates only one cylinder 1a. Each of the cylinders 1a is provided with a piston 2 in an axial direction of the cylinder 1a in a reciprocating manner. The reciprocating movement of the piston 2 is transmitted as a rotational movement to a crankshaft (output shaft) 4 via a connecting rod 3. The internal combustion engine 1 has a valve mechanism 5. The valve mechanism 5 has an intake valve 8 and an exhaust valve 9 for opening and closing an inlet passage 6 or an exhaust passage 7, electric motors 10 and 11 as driving sources, cam apparatuses 12 and 13 for converting the rotational movements of the electric motors 10 and 11 into opening and closing movements of the intake valve 8 and the exhaust valve 9. According to the valve mechanism 5, the intake valve 8 and the exhaust valve 9 can be arbitrarily operated by the electric motors 10 and 11 independently from the crankshaft 4. Further, by controlling the rotation of the electric motors 10 and 11, it is possible to freely change valve characteristics of the valves 8 and 9 (opening and closing timing, working angle, lift amount, and the like).

The operation of the internal combustion engine 1 is controlled by an engine control unit (ECU) 14. The ECU 14 has a microprocessor and peripheral apparatuses such as a ROM and RAM which serve as main storage apparatuses of the microprocessor, and is constituted as a computer which controls an operating state of the internal combustion engine 1, such as fuel injection amount to be injected to each cylinder 1a and ignition timing of an ignition plug 15 according to programs stored in the ROM. The ECU 14 is connected with a pressure sensor 16 for outputting a signal corresponding to internal pressure of the cylinder 1a, a crank angle sensor 17 for outputting a signal according to an angle of the crankshaft 4, and the like as input devices of information to be referred to when the operating state of the internal combustion engine 1 is controlled.

Figure 2:
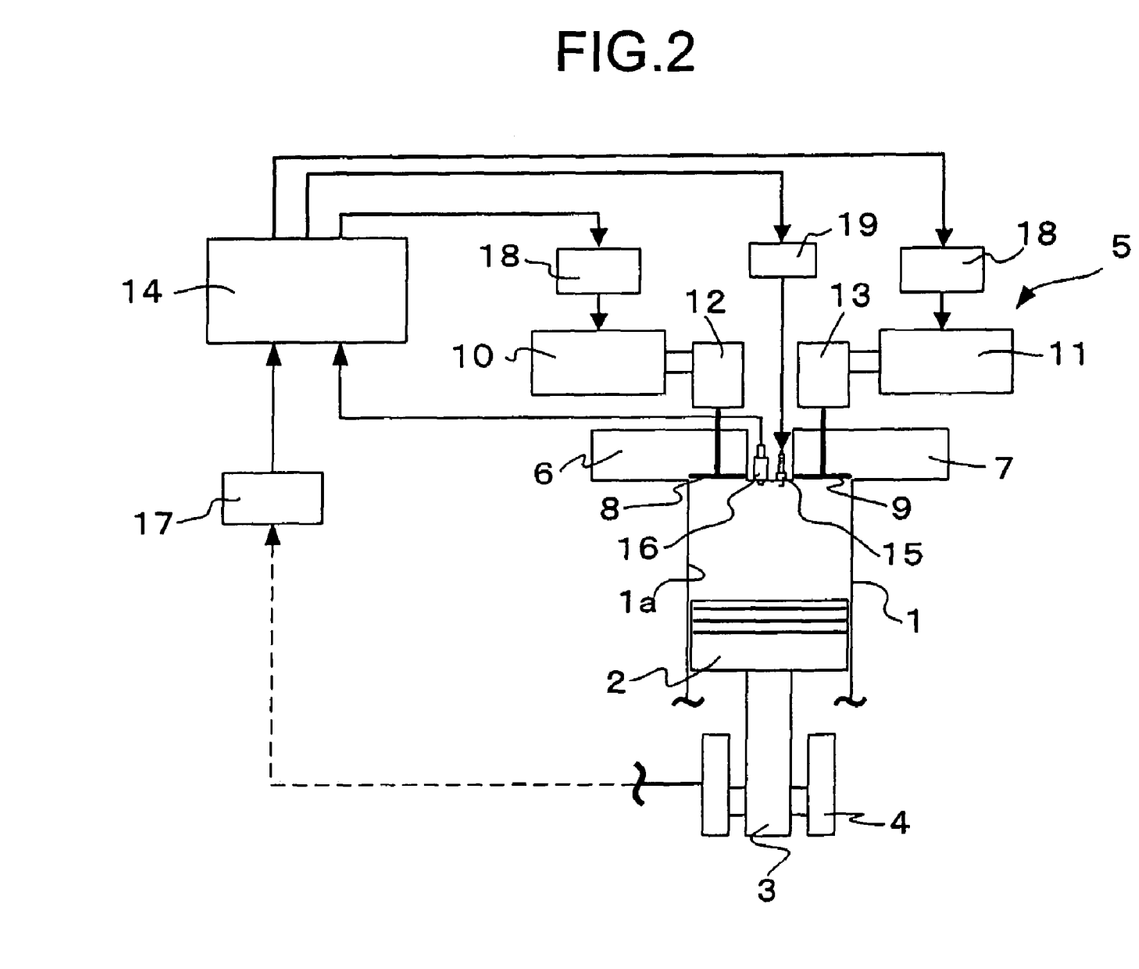
FIG. 2 is a diagram illustrating a state that an intake valve and an exhaust valve of the internal combustion engine in FIG. 1 are shut.

The ECU 14 executes a predetermined program so as to serve also as a valve controlling device for controlling an operation of the valve mechanism 5 via a driver (driving circuit) 18. The ECU 14, for example, refers to the output signal from the crank angle sensor 17 or the like and operates the intake valve 8 and the exhaust valve 9 in synchronization with the rotation of the crankshaft 4 so as to allow the internal combustion engine 1 to repeat each of an intake stroke, a compression stroke, an expansion stroke, and an exhaust stroke. When the motor generator generates the regenerative power at the time of deceleration or braking of the internal combustion engine 1, the ECU 14, as shown in FIG. 2, holds the intake valves 8 and the exhaust valves 9 of all the cylinders 1a in a closed state at all strokes of the intake stroke, the compression stroke, the expansion stroke and the exhaust stroke, namely, stops the electric motors 10 and 11 in positions where the intake valves 8 and the exhaust valves 9 are closed irrespective of the rotation of the crankshaft 4. When the intake valves 8 and the exhaust valves 9 are closed in such a manner, entering and discharging of air-fuel mixture in each cylinder 1a become approximately zero, and resistance for rotating the crankshaft 4 of the internal combustion engine 1 is reduced so that the regenerative power generation amount increases. Further, the ECU 14 ignites the ignition plug 15 in a state that the intake valves 8 and the exhaust valves 9 are closed at the time of generating the regenerative power, so as to burn the air-fuel mixture remaining in each cylinder 1a. Further, when the stop permission condition about the internal combustion engine 1 is satisfied during the regenerative power generation, the ECU 14 allows the valve mechanism 5 to perform a predetermined operation to stop the internal combustion engine 1. The control of the valve mechanism 5 by means of the ECU 14 from the deceleration or braking to the stop of the internal combustion engine 1 is explained below.

Figure 3:
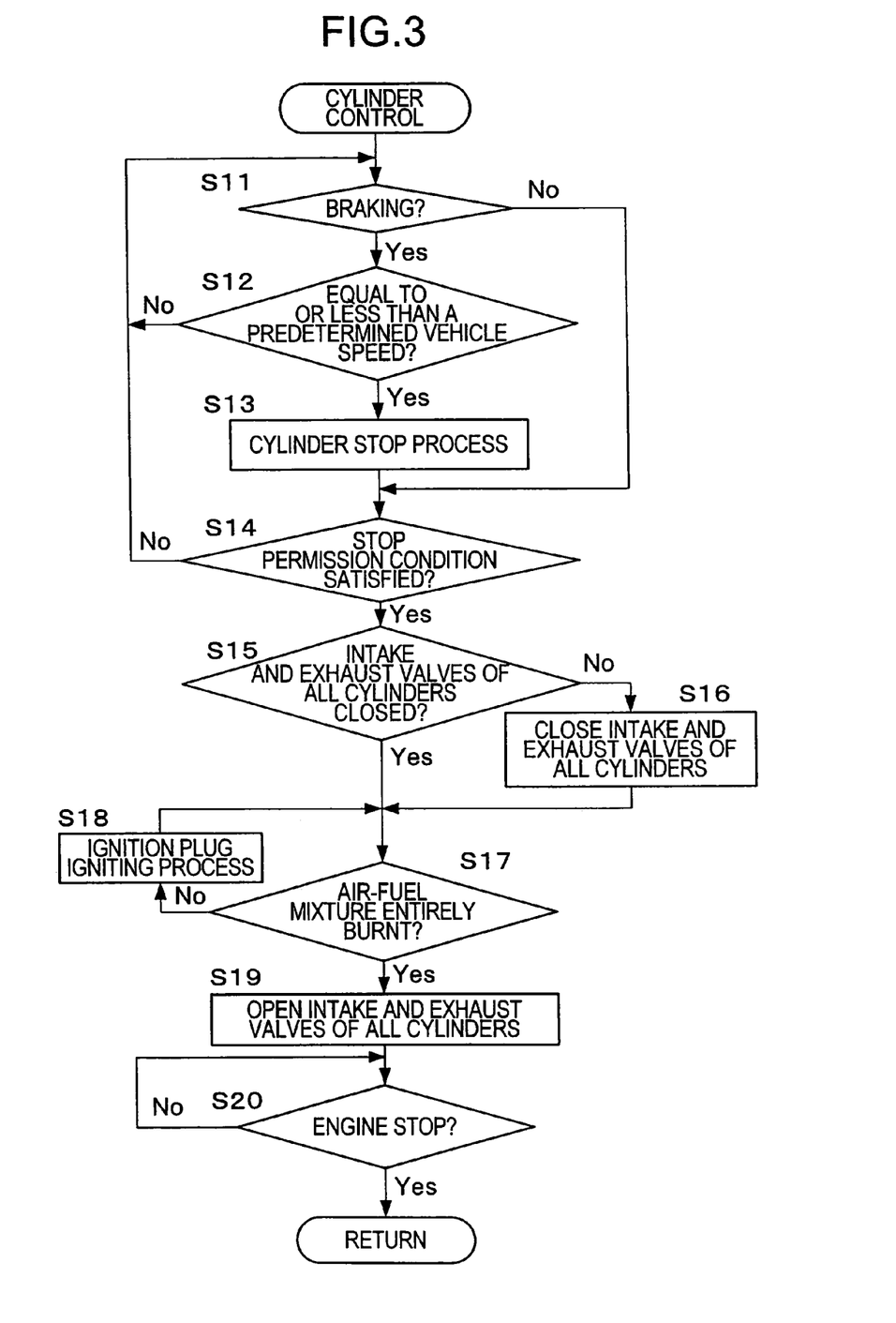
FIG. 3 is a flowchart showing a cylinder control routine executed in order to control an operation of a valve mechanism according to regenerative power generation and stop of the internal combustion engine from the state of the regenerative power generation.

FIG. 3 is a flowchart showing a cylinder control routine executed by the ECU 14 in order to control the valve mechanism 5 and the like in connection with the regenerative power generation from the motor generator. The cylinder control routine is executed in parallel with another routine during the operation of the internal combustion engine 1.

At the cylinder control routine in FIG. 3, the ECU 14 determines whether the vehicle is braked by a brake at step S11. When the vehicle is braked by the brake, the ECU 14 goes to step S12. At step S12, the ECU 14 determines whether a current vehicle speed is equal to or less than a speed at which the regenerative power generation is started. When this condition is established, the ECU 14 goes to step S13 so as to execute the cylinder stop processing. When the condition at step S12 is not established, the ECU 14 returns to step S11.

At the cylinder stop processing at step S13, the ECU 14 controls the operations of the electric motors 10 and 11 so that the intake valves 8 and the exhaust values 9 of all the cylinders 1a are closed and drives the motor generator by means of wheels so as to allow the motor generator to generate the regenerative power, and charge a battery with the obtained electric power. Further, at the cylinder stop processing at step S13, the ECU 14 ignites the ignition plug 15 in the state that the intake valves 8 and the exhaust valves 9 are closed, and allows the ignition plug 15 to burn the air-fuel mixture remaining in the cylinders 1a.

After the cylinder stop processing at step S13, the ECU 14 goes to step S14. If the vehicle is not braked by the brake at step S11, the ECU 14 also goes to step S14. At step S14, the ECU 14 determines whether the stop permission condition of the internal combustion engine 1 is satisfied. When the stop permission condition is satisfied, the ECU 14 goes to step S15, and when not, the ECU 14 returns to step S11.

At step S15, the ECU 14 confirms whether the intake valves 8 and the exhaust values 9 of all the cylinders 1a are closed. If they are closed, the ECU 14 maintains this state, and if not, the ECU 14 closes the intake valves 8 and the exhaust valves of all the cylinders 1a at step S16. At next step S17, the ECU 14 determines whether the combustion of the air-fuel mixture sealed in the cylinders 1a is ended. When the burning is continued in the cylinder 1a, a rotational fluctuation of the crankshaft 4 becomes larger than the case where the combustion is ended. For this reason, the ECU 14 refers to an output of the crank angle sensor 17, for example, and determines whether the rotational fluctuation of the crankshaft 4 is within a predetermined range, so as to be capable of determining whether the entire air-fuel mixture is burned.

When the ECU 14 determines that the combustion of the air-fuel mixture is not ended at step S17, the ECU 14 ignites the ignition plug 15 so as to allow it to burn the air-fuel mixture at step S18, and repeats the processes at steps S17 and S18 until the combustion is ended.

When the ECU 14 determines that the combustion of the air-fuel mixture is ended, the ECU 14 goes to step S19 so as to open the intake valves 8 and the exhaust valves 9 of all the cylinder 1. The ECU 14 confirms stop of the internal combustion engine 1 at step S20, and terminates the routine in FIG. 3. The ECU 14 can determine based on the output of the crank angle sensor 17, for example, whether the internal combustion engine 1 is actually stop.

According to this embodiment, when the motor generator generates the regenerative power, the intake valves 8 and the exhaust valves 9 are closed, but when the stopper mission condition is satisfied and the internal combustion engine 1 is being stopped, the intake valves 8 and the exhaust valves 9 are opened, so that the compression pressure of each cylinder 1a is released. The piston 2 is not, therefore, pushed back by the compression pressure in the cylinder 1a at the process for shutting down the internal combustion engine 1, and thus vibration at the time of the stop of the internal combustion engine 1 is reduced. Since the pressure of the cylinder 1a at the compression stroke is reduced at the time of stop, next start can be easily carried out. Further, since the air-fuel mixture sealed in the cylinders 1a is completely burned at the time of the regenerative power generation and then the intake valves 8 and the exhaust valves 9 are opened, there is no fear that the air-fuel mixture is exhausted as an exhaust gas. From an environmental viewpoint, therefore, this embodiment is preferable for durability of catalyst or the like provided as an exhaust emission purifying device.

Second Embodiment

Figure 4:
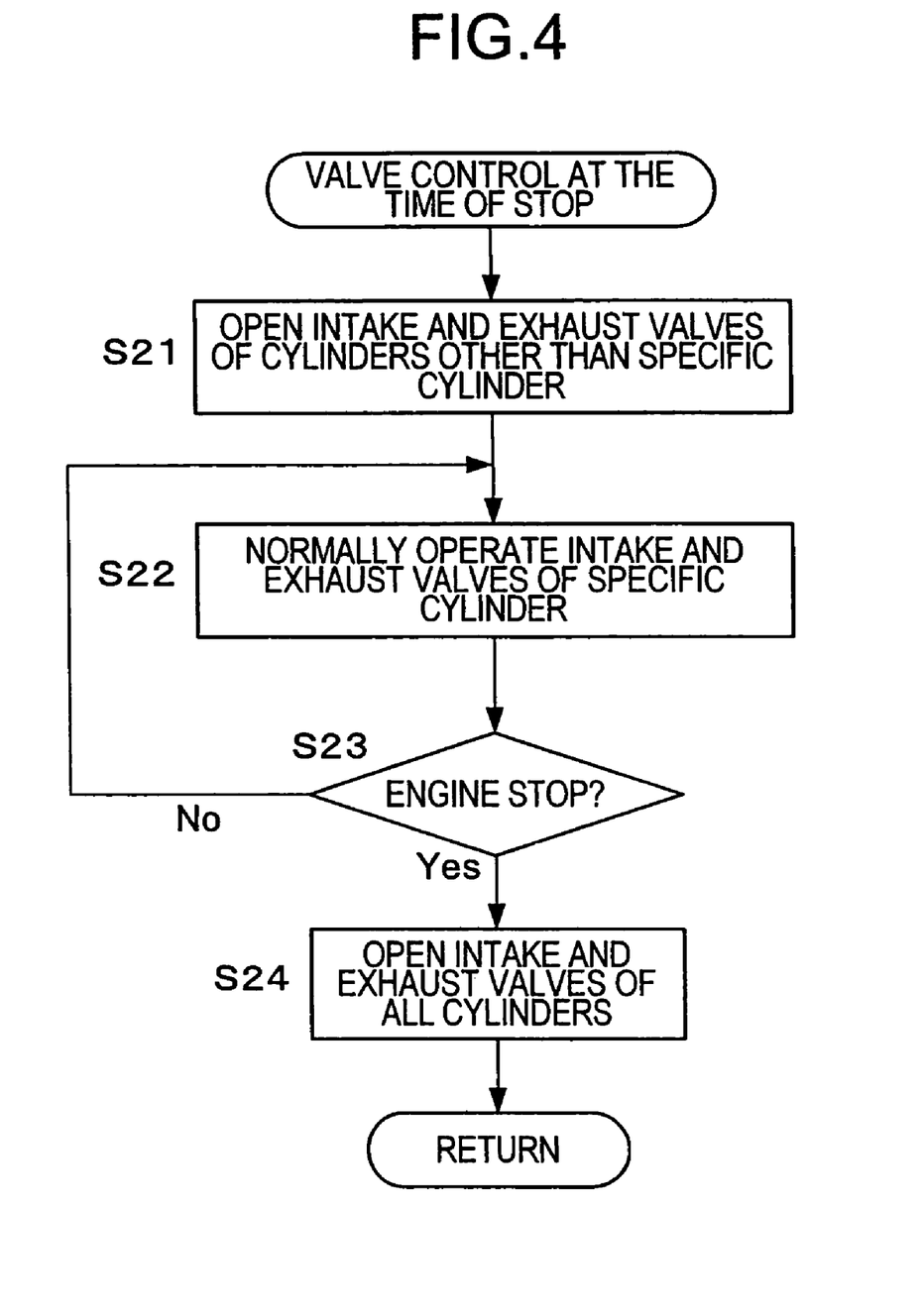
FIG. 4 is a flowchart showing a valve control routine at the time of stop executed in order to stop the internal combustion engine at a predetermined crank angle.

A second embodiment of the present invention is characterized in that at the stop process of the internal combustion engine 1 in the hybrid vehicle shown in FIG. 1, the ECU 14 controls the opening and closing operation of the intake valve 8 and the exhaust valve 9 of one specific cylinder (hereinafter, specific cylinder) 1a so as to stop the crankshaft 4 at a predetermined crank angle. FIG. 4 shows a procedure of a valve control routine at the time of stop executed by the ECU 14 in order to realize the control of the stop. The valve control routine at the time of stop is executed only at the stop process for the internal combustion engine 1. The routine in FIG. 4, for example, is started at suitable time after the stop permission condition is satisfied and is continued until the internal combustion engine 1 is completely stopped.

At the routine in FIG. 4, the ECU 14 opens the inlet vales 8 and the exhaust valves 9 of all the cylinders 1a other than the specific cylinder 1a at step S21. At next step S22, the ECU 14 normally operates the intake valve 8 and the exhaust valve 9 of the specific cylinder 1a. The normal operation here, is for driving the electric motors 10 and 11 according to the valve characteristics of the intake valve 8 and the exhaust valve 9 set by the ECU 14 (for example, opening and closing time, a lift amount and a working angle) and opening and closing the intake valve 8 and the exhaust valve 9 in synchronization with the rotation of the crankshaft 4. At next step S23, the ECU 14 refers to the information of the crank angle sensor 17 or the like, and determines whether the internal combustion engine 1 is stopped. When the internal combustion engine 1 is not stopped, the ECU 14 returns to step S22. At step S23, if the ECU 14 determines that the internal combustion engine 1 is stopped, the ECU 14 opens the intake valves 8 and the exhaust valves 9 of all the cylinders 1a at step S24, and then terminates the routine in FIG. 4.

According to the above routine, since the compression pressure is generated only at a specific crank angle, the crankshaft 4 can be stopped in a range of the specified crank angle. This is explained with reference to FIG. 5.

Figure 5:
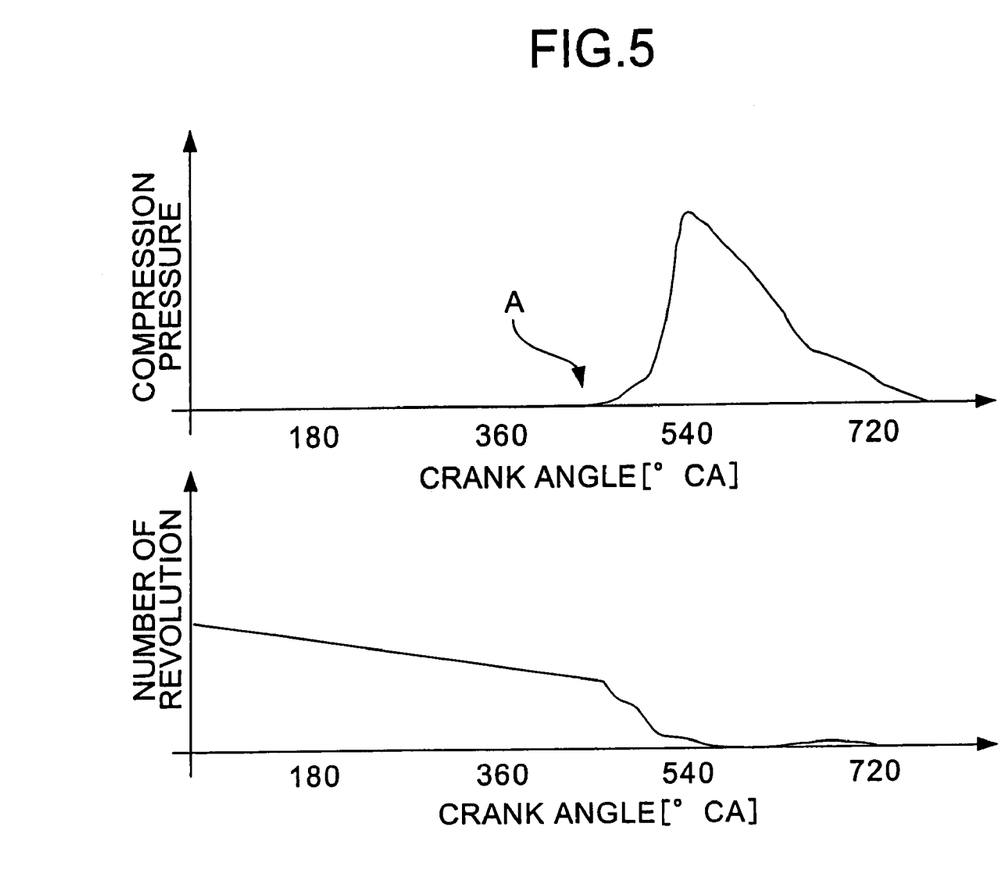
FIG. 5 is a diagram illustrating a relationship between a crank angle, compression pressure and a number of revolution of the engine in the case where the routine in FIG. 4 is executed.

FIG. 5 shows one example of a relationship between the compression pressure in the entire internal combustion engine 1, a number of revolution and the crank angle of the internal combustion engine 1 when the ECU 14 executes the routine in FIG. 4. In the example of FIG. 5, a cylinder of the four cylinders 1a in the internal combustion engine 1, where the piston 2 reaches a top dead center at the compression stroke when the crank angle is 540° CA, is selected as the specific cylinder 1a.

In FIG. 5, the intake valve 8 and the exhaust valve 9 are closed around the crank angle indicated by an arrow A, so that the compression stroke in the specific cylinder 1a is started. When the compression stroke is carried out in the specific cylinder 1a, the compression pressure is generated therein. The compression pressure acts to a direction of pushing back the piston 2 of the specific cylinder 1a, and the piston 2 rises against the compression pressure so that a compression work is generated in the specific cylinder 1a. The compression work consumes kinetic energy of the crankshaft 4, thereby reducing its number of revolution (rotational speed). When the kinetic energy of the crankshaft 4 becomes smaller than the compression work in the specific cylinder 1a, the piston 2 does not reach the top dead center and the crankshaft 4 is stopped. The compression work of the specific cylinder 1a is generated in a constant crank angle range, whereas the compression work is not generated in the cylinders 1a other than the specific cylinder 1a, because the intake valves 8 and the exhaust valves 9 thereof are opened. The crankshaft 4, therefore, is stopped in an approximately fixed position short of the peak of the compression work of the specific cylinder 1a.

Figure 6:
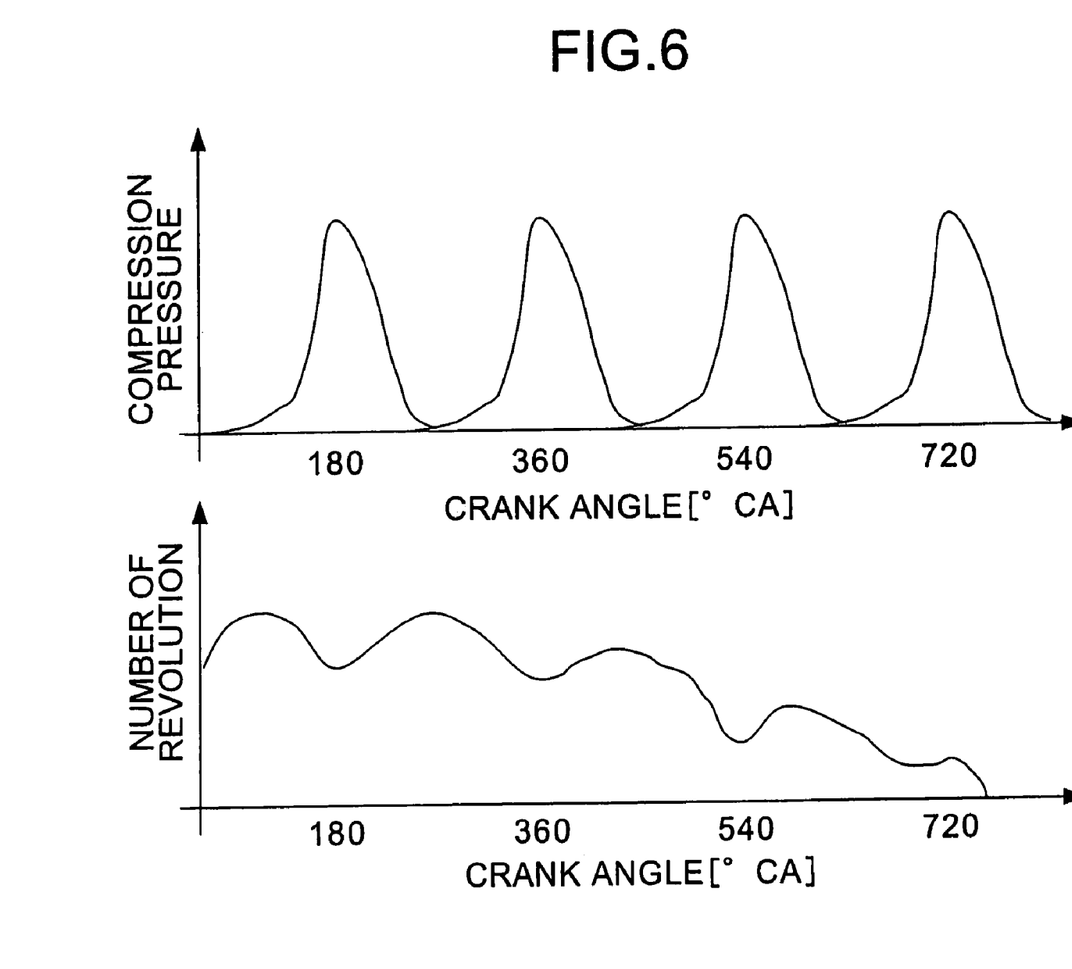
FIG. 6 is a diagram as a comparative example illustrating a relationship between the crank angle, the compression pressure and the number of revolution of the engine in the case where the routine in FIG. 4 is not executed.

FIG. 6 shows a relationship between the compression pressure, and the number of revolution and the crank angle of the internal combustion engine 1 when the compression stroke is generated in all the cylinders 1a. In the in-line four-cylinder internal combustion engine 1, since the pistons 2 of the cylinders 1a are connected with the crankshaft 4 with their phases shift by 180° CA, if the compression stroke is carried out in all the cylinders 1a, the compression work is generated at each 180° CA. Therefore, a determination cannot be made uniquely at what crank angle the crankshaft 4 is stopped.

The stop position of the crankshaft 4 occasionally disperses in a certain range in the case where it depends only on the compression work of the piston 2. Therefore, at the process for stopping the crankshaft by utilizing the compression work of the specific cylinder 1a, it is applicable to use the motor generator in parallel so as to adjust the stop position of the crankshaft 4. In this case, since the crankshaft 4 is stopped in an approximately constant position by the compression work of the specific cylinder 1a, only small electric load on the motor generator is sufficient for adjusting the stop position of the crankshaft 4.

Third Embodiment

Figure 7:
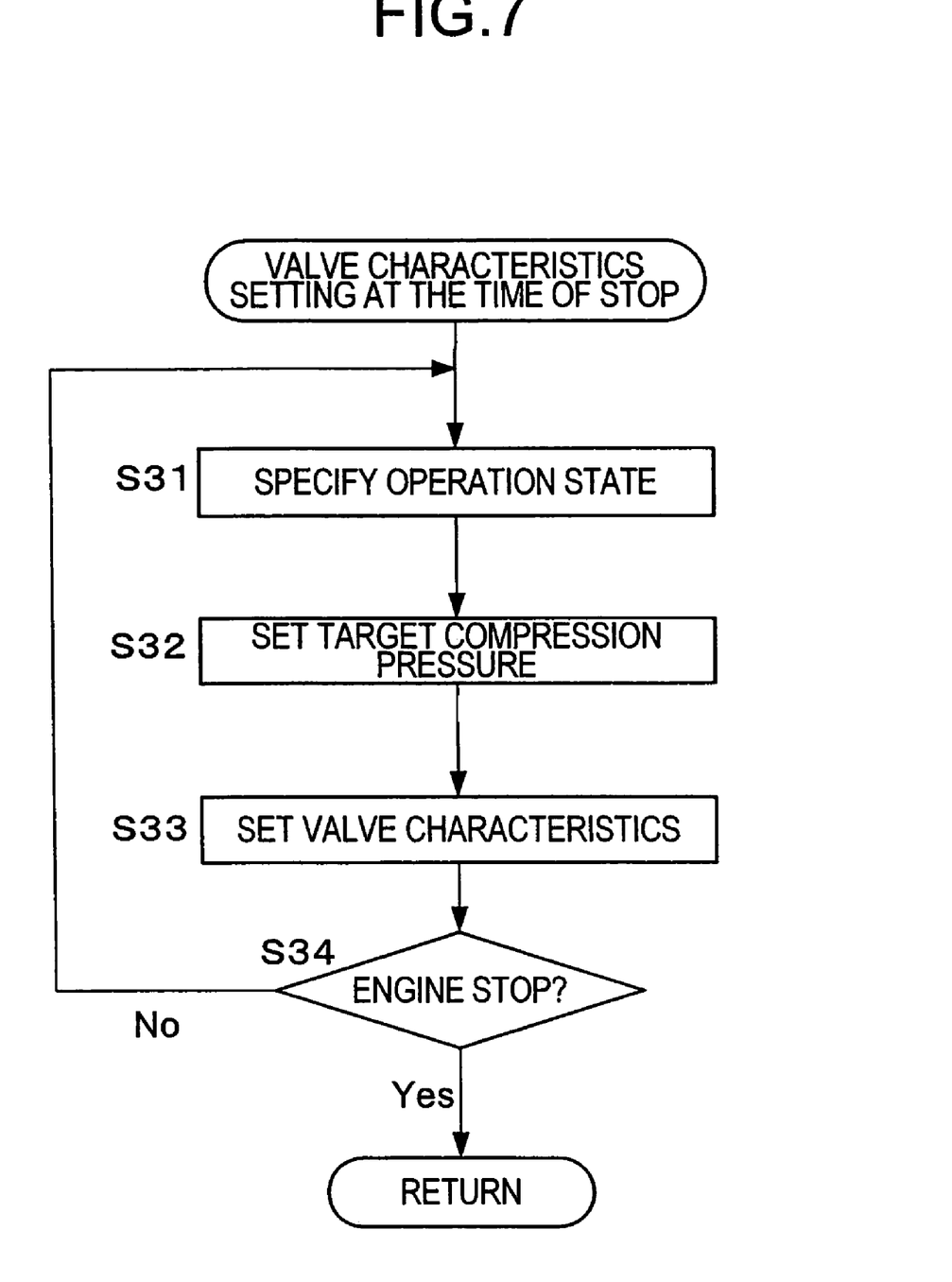
FIG. 7 is a flowchart showing a valve characteristics setting routine at the time of stop executed in order to gradually decrease the compression pressure at a stop processing of the internal combustion engine.

A third embodiment of the present invention is characterized in that a quantity of the compression work generated in the specific cylinder in the second embodiment is gradually reduced, and the crankshaft 4 is stopped at a predetermined crank angle. FIG. 7 shows a procedure of a valve characteristic setting routine at the time of stop executed by the ECU 14 in order to realize the stop control. The routine in FIG. 7 is executed in parallel with the valve control routine at the time of stop only while the process for stopping the internal combustion engine 1.

In the routine in FIG. 7, the ECU 14 specifies the operating state of the internal combustion engine 1 at step s31. The operating state can be specified by various parameters correlative with the operating state at the process for stopping the internal combustion engine 1. The parameters include a number of revolution of the combustion engine specified based on the crank angle detected by the crank angle sensor 17, and the compression pressure in the cylinders 1a detected by the pressure sensor 16.

Figure 8:
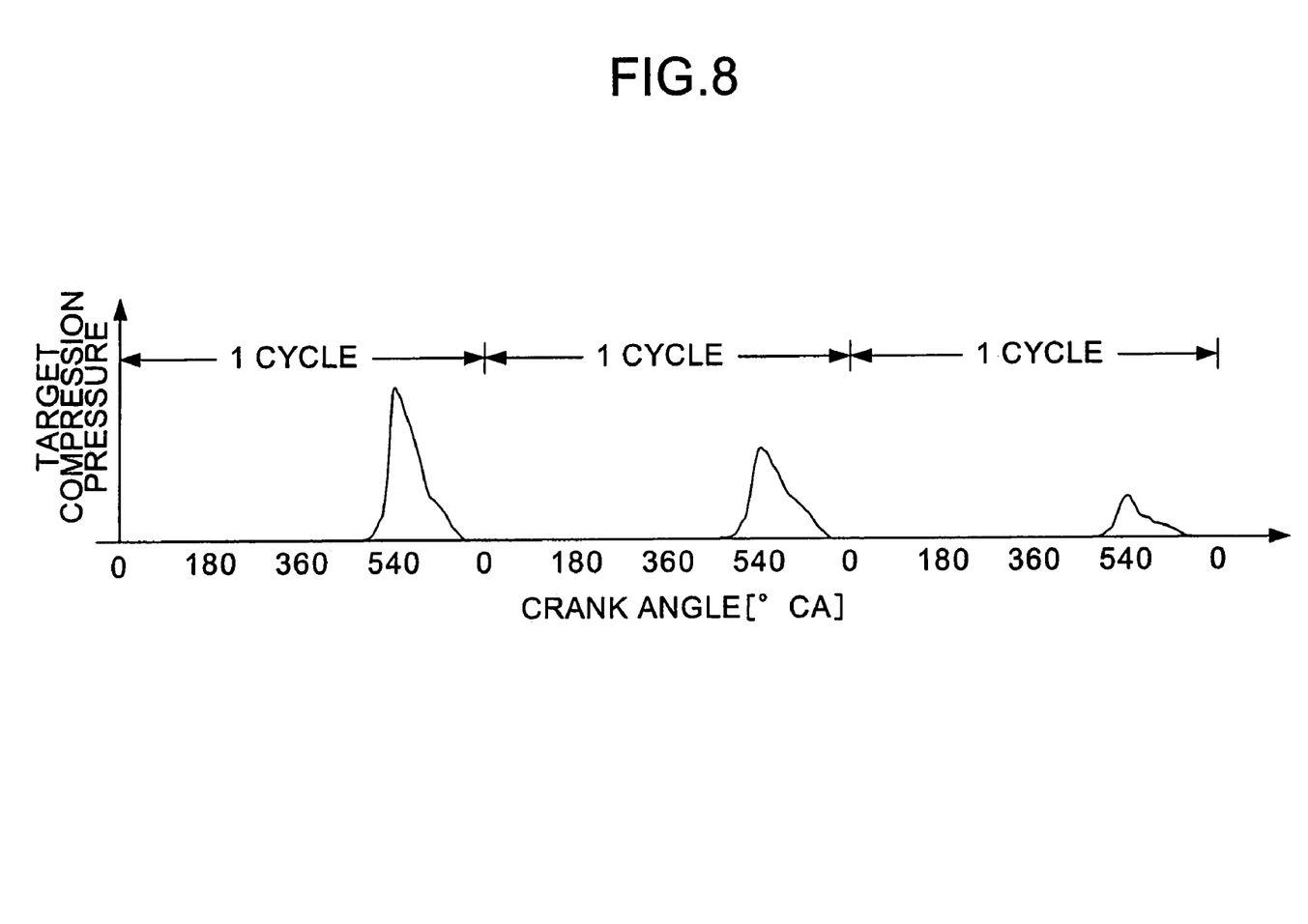
FIG. 8 is a diagram illustrating one example of a corresponding relationship between the crank angle and target compression pressure which is referred to in the routine of FIG. 7.

At next step S32, target compression pressure of the cylinders 1a is set according to the specified operating state. The target compression pressure is determined so as to be, for example as shown in FIG. 8, gradually lower every time when the specific cylinder 1a undergoes the expansion stroke. In other words, at the process for stopping the internal combustion engine 1, the target compression pressure is set so that a compression workload of the piston 2 in the specific cylinder 1a is gradually reduced. A relationship between the operating state of the internal combustion engine 1 and the target compression pressure is preset by experiment or simulation, and is stored as a map or a function in the ROM of the ECU 14 so as to thereby be suitably referred to.

At next step S33, the valve characteristics of the intake valves 8 and the exhaust valves 9 in the valve mechanism 5 are set so that the target compression pressure set at step S32 can be obtained. Namely, the compression pressure is related with an amount of air taken into the cylinders 1a and an amount of air exhausted from the cylinders 1a, an amount of the intake air is correlated with the valve characteristics of the intake valves 8, and an amount of the exhaust air is correlated with the valve characteristics of the exhaust vales 9. For this reason, the ECU 14 changes at least one parameter for determining the valve characteristics of the intake valves 8 and the exhaust valves 9 so that the target compression pressure is obtained. The relationship between the target compression pressure and the valve characteristics is predetermined by experiment or simulation, and is recorded as a map or a function into the ROM of the ECU 14 to thereby be suitably referred to. Further, the valve characteristics set at step S33 are reflected in the normal operation at step S22 in FIG. 4.

At next step S33, the ECU 14 determines whether the internal combustion engine 1 is stopped similarly to FIG. 4, and repeats the processing at steps S31 to S33 until the internal combustion engine 1 is stopped. When the ECU 14 determines that the internal combustion engine 1 is stopped, the ECU 14 terminates the routine in FIG. 7.

According to the above routine, since the compression pressure is generated only in the specific cylinder 1a, similarly to the second embodiment, the crankshaft 4 can be stopped in an approximately constant position. Further, since the compression pressure of the specific cylinder 1a is gradually reduced, vibration just before the stop is suppressed so that the internal combustion engine 1 can be stopped gently.

Fourth Embodiment

Figure 9:
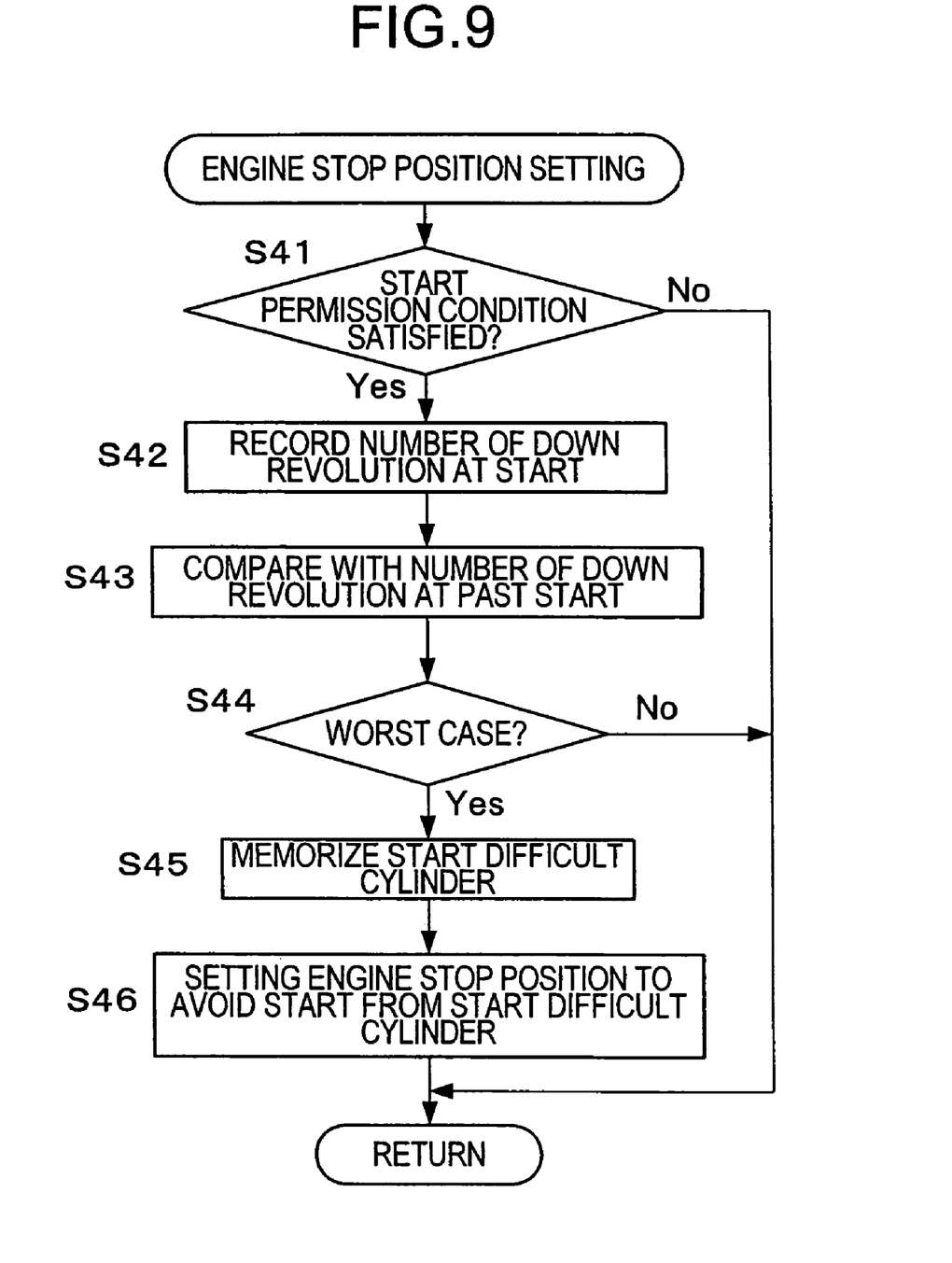
FIG. 9 is a flowchart showing an engines top position setting routine executed in order to set the stop position of the internal combustion engine.

In a fourth embodiment of the present invention, a next stop position of the crankshaft 4 is changed based on a starting condition in the past of the internal combustion engine 1. FIG. 9 shows a procedure of an engine stop position setting routine executed by the ECU 14 in order to realize such control. By executing the engine stop position setting routine, the ECU 14 serves as the stop position setting device. The details are explained below. Note that the routine in FIG. 9 is repeated in a constant cycle while the stop permission condition is satisfied and the internal combustion engine 1 is in the stop state, namely, the internal combustion engine 1 is controlled by the ECU 14 in a temporary stop state. Such a stop state can be distinguished from a state in which the internal combustion engine 1 is being stopped due to the turning off of the ignition switch, on view points whether the ECU 14 monitors the stop state of the internal combustion engine 1 and whether the ECU 14 can automatically start the internal combustion engine 1.

In the routine of FIG. 9, the ECU 14 determines at step S41 whether the start permission condition of the internal combustion engine 1 is satisfied. When the start permission condition is not satisfied, the ECU 14 terminates the current routine. When the start permission condition is satisfied, the ECU 14 goes to step S42, refers to the information of the crank angle sensor 17 or the like, detects a number of revolution (a number of down revolution) when the rotation of the crankshaft 4 is slowed down the most at the time of the start of the internal combustion engine 1 and records the number of revolution in the storage apparatus of the ECU 14. As the storage apparatus to be used here, a flash ROM which is capable of carrying out storage even if the power source to the ECU 14 is cut, or a backup RAM in which the storage is held by a battery are suitable. If the storage does not have to be held after the power source of the ECU 14 is cut, a volatile work RAM may be used. The start of the internal combustion engine 1 in the case where the start permission condition is satisfied is realized in such a manner that the ECU 14 executes the combustion engine start program, not shown.

At next step S43, the ECU 14 compares a number of past down revolution recorded in the storage apparatus with the number of down revolution recorded at step S42. The ECU 14 then goes to step S44, and determines whether the number of revolution recorded at step S42 corresponds to a case where the number of revolution is the lowest as compared with the number of past revolutions stored in the storage apparatus (worst case). When it is not the worst case, the ECU 14 terminates the routine in FIG. 9. When it is the worst case, the ECU 14 goes to step S45, and memorizes the cylinder in the compression stroke at the time of currently starting the internal combustion engine 1 as a start difficult cylinder into the storage apparatus of the ECU 14. At step S46, the ECU 14 sets a next stop position of the internal combustion engine 1 so that the start from the start difficult cylinder is avoided. In order to realize this setting, the specific cylinder 1a at the valve control routine at the time of stop in FIG. 4 may be set as a cylinder other than the start difficult cylinder. After the processing at step S46, the ECU 14 terminates the current routine.

When the stop permission condition of the internal combustion engine 1 is satisfied after the stop position is set in such a manner, the valve control routine at the time of stop in FIG. 4 is executed so that the crankshaft 4 is stopped in the stop position. As a result, the internal combustion engine 1 is not stopped in a state that the start difficult cylinder is in the compression stroke.

In order to start the internal combustion engine 1, it is necessary to move the piston 2 to the top dead center against the compression pressure of the cylinder in the compression stroke at the time of start, and the number of revolution of the internal combustion engine 1 temporarily slows down due to the compression work at that time. As the compression work is larger, a number of down revolution becomes higher. That is to say, the number of down revolution at the time of start of the internal combustion engine 1 reflects on a compression workload of the cylinder in the compression stroke at the time of start. Although a compression workload generated in the cylinders in the compression stroke is ideally the same as each other, actually a compression workload in each cylinder is not constant due to influences of dimensional error or an installing error of parts. When the routine in FIG. 9 is executed in a state that a compression workload duffers among the cylinders, the internal combustion engine 1 is not stopped in a state that a cylinder, where a compression workload is the largest, is in the compression stroke. For this reason, the compression work at the time of start is reduced, and the internal combustion engine 1 can be started by less energy.

Instead of the processing for stopping the internal combustion engine 1 with the start difficult cylinder recorded as the worst case being avoided, a case where a number of down rotation is the least is recorded as the best case, and at the time of next stop of the internal combustion engine 1, the operation of the valve mechanism 5 may be controlled so that the internal combustion engine 1 is stopped in a state that the cylinder of the best case is in the compression stroke. When the stop position is controlled in such a manner, the internal combustion engine 1 can be started by the least energy.

In another manner, the stop position of the internal combustion engine can be controlled based on past start track records from various viewpoints. For example, when the start of the internal combustion engine is failed, the cylinder in the compression stroke is stored, and the stop position of the internal combustion engine 1 may be set so that a cylinder where the start is ended in failure the most frequently does not undergo the compression stroke at the time of start. A number of times at which the cylinders were in the compression stroke at the time of past start is recorded for each cylinder, and the stop position of the crankshaft 4 may be suitably changed so that the number of times disperses moderately in the cylinders. When the stop position is dispersed in such a manner, mechanical deviation, which is caused by always stop the crankshaft 4 in the constant position, can be suppressed. When a number of down revolution is remarkably increased as compared with that at the time of past start, certain abnormality is regarded to occur and warning may be given.

In the embodiments, the ECU 14 serves as the valve controlling device, and the stop control apparatus of the present invention is realized by the combination of the ECU 14 and the valve mechanism 5. However, the present invention is not limited to the above embodiments, and can be carried out in various forms. In the second and third embodiments, for example, a single cylinder is set as the specific cylinder, and the compression pressure is generated only in the specific cylinder. The compression pressure may be, however, generated also in cylinders other than the specific cylinder within a range where the internal combustion engine is not stopped, and thus a preliminary braking function for securely stopping the internal combustion engine utilizing the compression pressure in the specific cylinder may be generated in the internal combustion engine. The motor generator may be combined for controlling the stop position.

The present invention is not limited to the hybrid vehicle, and can be applied also to a case where the motor generator is not present. Further, the valve characteristics setting routine at the time of stop in FIG. 7 can be applied also to the case where the specific cylinder is not present. That is to say, the valve characteristics of the cylinders are varied so that the compression pressure is gradually reduced according to reduction in a number of revolution of the crankshaft 4 without particularly fixing the stop position, thereby applying the routine in FIG. 7 to an application where the internal combustion engine 1 is stopped smoothly. The valve mechanism is not limited to one for driving a cam by means of the electric motors, and a valve mechanism, which drives the intake valves and the exhaust valves utilizing various mechanisms such as a link, may be used. For example, a valve mechanism, which gives arbitrary opening and closing characteristics to the intake valves or the exhaust valves utilizing a three-dimensional cam, may be utilized, or a cam selection type valve mechanism provided with a plurality of cams interlocking with the crankshaft, which suitably selects a cam for actually actuating the intake valves or the exhaust valves suitably according to circumstances, may be utilized.

As explained above, according to the stop control apparatus of the internal combustion engine of the present invention, the intake valves or the exhaust valves are operated arbitrarily regardless of the rotational state of the output shaft, and the state in the cylinders of the internal combustion engine is suitably changed so that the internal combustion engine can be stopped in a predetermined state. The internal combustion engine can be, therefore, stopped in the predetermined state even in a vehicle where the motor generator is not provided as the driving source for traveling. Further, even in the case where the motor generator is provided, the electrical load required for controlling the stop state is reduced so that the energy efficiency at the time of traveling the vehicle can be heightened.

What is claimed is:

1. A stop control apparatus for an internal combustion engine, comprising:
    a valve mechanism for operating at least one of an intake valve and an exhaust valve independently of an output shaft of the internal combustion engine; and
    a valve controlling device for controlling the operation of the valve mechanism so that the internal combustion engine is stopped in a predetermined state, wherein the valve controlling device is adapted to hold the intake valve or the exhaust valve in a closed state irrespective of a state of rotation of the output shaft.

2. The stop control apparatus of the internal combustion engine according to claim 1, wherein the internal combustion engine is used as a driving source of a vehicle, the vehicle is capable of generating regenerative power by driving an electric generator using kinetic energy at the time of deceleration, the valve mechanism is capable of driving both the intake valve and the exhaust valve, and the valve controlling device controls the operation of the valve mechanism so that the intake valve and the exhaust valve are closed during execution of the regenerative power generation, and that the internal combustion engine is stopped after the intake valve or the exhaust valve are opened to release compression pressure of the internal combustion engine, as in the predetermined state, when the internal combustion engine is stopped successively from the state that the regenerative power generation is executed.

3. The stop control apparatus of the internal combustion engine according to claim 2, wherein when the internal combustion engine is stopped successively from the state where the regenerative power generation is executed, the valve controlling device maintains the intake valve and the exhaust valve in a closed state until burning of air-fuel mixture sealed in a cylinder of the internal combustion engine is ended, and controls the operation of the valve mechanism so that the intake valve or the exhaust valve is opened after the burning is ended.

4. The stop control apparatus of the internal combustion engine according to claim 1, wherein the internal combustion engine is provided with a plurality of cylinders in such a manner that timings of compression strokes of the cylinders are deviated from each other, and the valve controlling device controls the operation of the valve mechanism so that the internal combustion engine is stopped, as in the predetermined state, when a rotational position of the output shaft is within a specified range in a part of a rotating range of the output shaft.

5. The stop control apparatus of the internal combustion engine according to claim 4, wherein the valve controlling device controls a compression workload to be generated in a compression stroke during a process of stopping the internal combustion engine correspondingly to the rotational position of the output shaft during the process of stopping the internal combustion engine, to thereby stop the internal combustion engine when the output shaft is within the specified range.

6. The stop control apparatus of the internal combustion engine according to claim 4, wherein the valve controlling device controls the operation of the valve mechanism so that a compression workload in at least one specific cylinder of the cylinders becomes larger than a compression workload in the other cylinders, to thereby stop the internal combustion engine when the output shaft is within the specified range.

7. The stop control apparatus of the internal combustion engine according to claim 5, wherein the valve controlling device controls the operation of the valve mechanism so that the compression workload generated in the process of stopping the internal combustion engine is gradually reduced.

8. The stop control apparatus of the internal combustion engine according to claim 6, wherein the valve controlling device controls the operation of the valve mechanism so that the compression workload generated in the process of stopping the internal combustion engine is gradually reduced.

9. The stop control apparatus of the internal combustion engine according to claim 4, further comprising a stop position setting device for detecting a state of the internal combustion engine at the time of start and for setting the specified range based on a detected state.

10. The stop control apparatus of the internal combustion engine according to claim 9, wherein the stop position setting device detects information correlated with the compression workload at the time of start as the state of the start, and sets the specified range based on a detected information so that the internal combustion engine is stopped in a state that a cylinder of the cylinders where the compression workload at the time of start is relatively smaller than the other cylinders is in the compression stroke.

* * * * *